United States Patent [19]
Nelson

[11] 3,947,074
[45] Mar. 30, 1976

[54] REVERSIBLE TRACK LINK WITH REPLACEABLE RAIL AND METHOD

[75] Inventor: David V. Nelson, East Peoria, Ill.

[73] Assignee: Caterpillar Tractor Co., Peoria, Ill.

[22] Filed: Jan. 27, 1975

[21] Appl. No.: 544,085

[52] U.S. Cl. ............................ 305/54; 305/58 R
[51] Int. Cl.² .................................... B62D 55/20
[58] Field of Search ............. 305/54, 56, 57, 58, 10

[56] References Cited
UNITED STATES PATENTS

| | | | |
|---|---|---|---|
| 2,329,303 | 4/1944 | Stewart | 305/54 X |
| 3,237,999 | 3/1966 | Pentecost | 305/56 |
| 3,427,079 | 2/1969 | Skromme | 305/58 |
| 3,822,923 | 7/1974 | Stedman | 305/58 |

*Primary Examiner*—Philip Goodman
*Attorney, Agent, or Firm*—Phillips, Moore, Weissenberger Lempio & Strabala

[57] ABSTRACT

An endless track assembly for a track type vehicle comprises a symmetrical track link having a rail segment and a track shoe disposed on upper and lower surfaces thereof, respectively. A pair of longitudinally spaced bosses are secured to an underside of the rail segment and are each disposed in a bore formed transversely through the track link. A bolt extends upwardly through the track shoe and bore and is threadably attached to each of the bosses. Upon release of the bolts, the rail segment and track shoe may be reattached to opposite sides of the link.

9 Claims, 2 Drawing Figures

REVERSIBLE TRACK LINK WITH REPLACEABLE RAIL AND METHOD

BACKGROUND OF THE INVENTION

Conventional track type vehicles, such as crawler tractors, are adapted for heavy duty work during various construction and earthworking operations. Each endless track assembly thereof comprises a pin and bushing assembly for pivotally connecting each pair of adjacent links and track shoes together. The bushings, which further function as drive lugs adapted to engage the teeth of a drive sprocket, are subjected to wear and require periodic repair or replacement. The servicing of such bushings is time consuming and necessitates rather expensive repair or replacement procedures. In addition, a rail segment is oftentimes secured on one side of each link and must be replaced periodically.

SUMMARY OF THE INVENTION

An object of this invention is to overcome the above briefly described problems by providing an economical track link assembly and method for expeditiously providing a new bearing surface on a drive lug attached to the link upon reversal of a rail segment and track shoe thereon. At least one continuous bore is formed transversely through the track link to intersect upper and lower surfaces thereof, having the rail segment and track shoe disposed thereon, respectively. An internally threaded annular boss is secured to an underside of the rail segment and is disposed in the bore and fastening means extend upwardly through the track shoe and the bore into threaded engagement with the boss. The method is carried forth by interchanging the dispositions of the rail segment and track shoes.

BRIEF DESCRIPTION OF THE DRAWINGS

Further objects of this invention will become apparent from the following description and the accompanying drawing wherein.

DETAILED DESCRIPTION OF THE INVENTION

Figure 1:
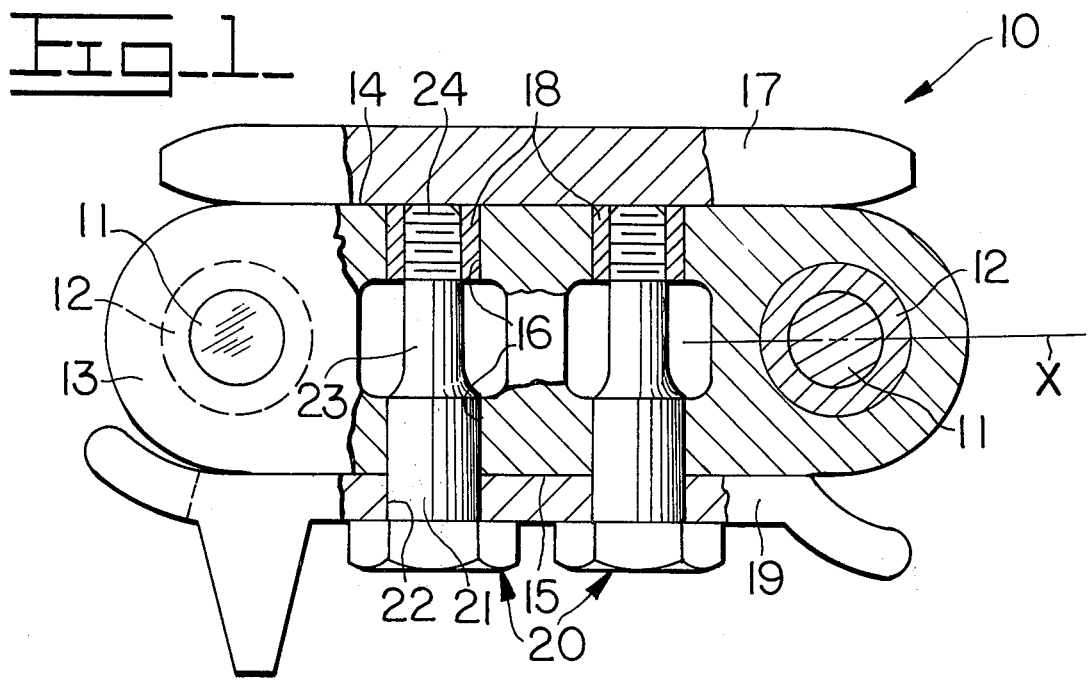
FIG. 1 is a partially sectioned side elevational view of a track link assembly embodying this invention.
Figure 2:
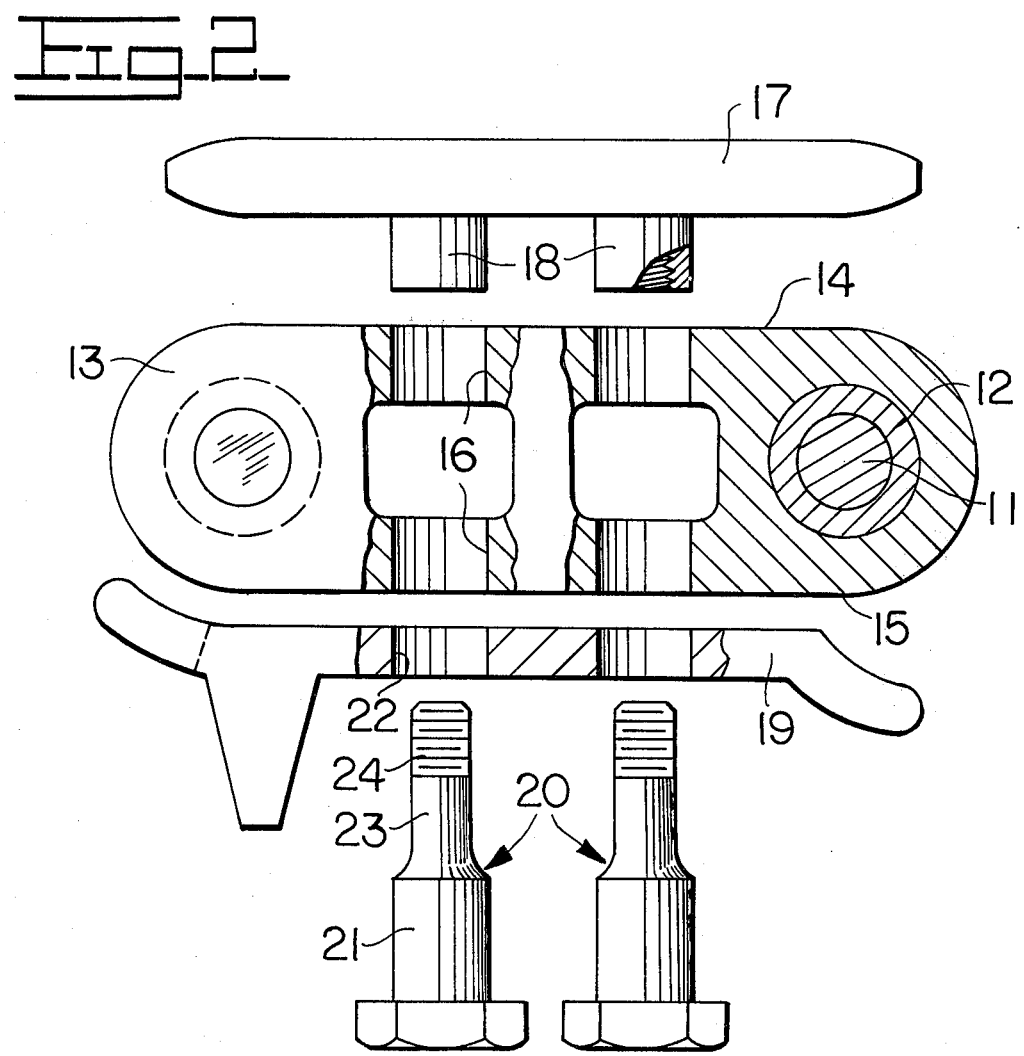
FIG. 2 is an exploded view of the track link assembly.

Referring to the drawing, a track link assembly 10 is adapted for use in an endless track assembly of a track-type vehicle, such as a crawler tractor. In particular, each pair of adjacent link assemblies are connected together by a pin 11 and annular bushing 12 in a conventional manner to form the endless track assembly. In operation, bushings 12 further function as drive lugs upon their engagement with the teeth of a conventional drive sprocket (not shown) of the tractor.

The track link assembly comprises a track link 13 which is symmetrical in configuration about a longitudinal axis X thereof to adapt it for reversal purposes, hereinafter described. The track link defines substantially flat upper and lower parallel surfaces 14 and 15, respectively, and has a pin and bushing assembly 11–12 mounted on each longitudinal end thereof. A pair of longitudinally spaced first bores 16 are formed transversely through the link to intersect surfaces 14 and 15 thereof.

A generally flat rail segment 17, adapted to engage track rollers mounted on the suspension system of the tractor (not shown), is disposed on surface 14. A pair of longitudinally spaced and internally threaded bosses 18 are suitably secured to the underside of the rail segment, such as by inertia welding techniques. Each of the bosses is closely fitted within a respective bore 16 to prevent lateral movement of the rail segment relative to the track link.

A standard track shoe 19 is disposed on lower surface 15 of the track link and is secured thereon by a pair of fastening means, such as shoulder bolts 20. Each of the bolts comprises a cylindrical portion 21 which extends upwardly into close fitting relationship within a second bore 22, formed through the track shoe, and the lower end of bore 16 which is aligned with bore 22 and has an inside diameter identical thereto. A reduced necked-down portion 23 of the bolt terminates at its upper end at threads 24 which threadably engage boss 18.

Upon the undue wearing of one side of bushing 12 by its continuous engagement with the teeth of the tractor's drive sprocket (not shown), the endless track assembly is initially disconnected at its conventional master track link (not shown). Shoulder bolts 20 are then removed to release rail segment 17 and track shoe 19 from each of the track link assemblies. The rail segment and track shoe are then interchanged and reattached at surfaces 15 and 14, respectively, to provide a new and unused sprocket engaging bearing surface on bushing 12. Bosses 18 aid in piloting the rail segment into its correct position whereas cylindrical portions 21 of the bolts aid in precisely piloting the bolts into threaded engagement with the bosses. The endless track assemblies are then each reinstalled on the tractor by reconnecting the master track links thereof.

I claim:

1. A track link assembly for an endless track assembly of a track type vehicle comprising:
   a track link defining upper and lower surfaces thereon and means defining at least one first bore transversely through said track link in intersecting relationship with the upper and lower surfaces thereof;
   a rail segment disposed on said upper surface and having an internally threaded annular boss secured on an underside thereof, said boss being disposed in close-fitting relationship within said first bore;
   a track shoe disposed on said lower surface; and
   fastening means extending in aligned relationship upwardly through said track shoe and said first bore and threadably attached within said boss.

2. The track link assembly of claim 1 further comprising a pin and bushing assembly mounted at each longitudinal end of said track link.

3. The track link assembly of claim 1 wherein said fastening means comprises a bolt extending upwardly through a second bore formed through said track shoe, said second bore being aligned axially with said first bore and having an inside diameter substantially identical thereto.

4. The track link assembly of claim 3 wherein said bolt comprises a cylindrical portion having an outside diameter slightly less than the inside diameter of each of said first and second bores and a reduced necked-down portion extending upwardly from said cylindrical portion and terminating at its upper end at a threaded portion threadably engaged within said boss.

5. The track link assembly of claim 1 wherein a pair of said annular bosses are secured to an underside of said rail segment in longitudinally spaced relationship thereunder and wherein a said fastening means is threadably attached to each of said bosses.

6. The track link assembly of claim 1 wherein said link is substantially symmetrical about a longitudinal axis thereof and said upper and lower surfaces are each substantially flat and disposed in parallel relationship relative to each other.

7. A method for providing a new bearing surface on drive lug of a track line assembly comprising a track link having a rail segment and a track shoe attached on upper and lower surfaces thereof by at least one fastening means, said method comprising the steps of:

removing said fastening means, said rail segment and said track shoe from said track link;

repositioning said rail segment on the lower surface of said track link;

repositioning said track shoe on the upper surface of said track link; and simultaneously reattaching said rail segment and said track shoe together with said fastening means.

8. The method of claim 7 further comprising the step of piloting said fastening means in a pair of aligned bores formed through said track shoe and through said track link and threadably attaching said fastening means to said rail segment.

9. The method of claim 8 further comprising the step of piloting a boss of said rail segment in the bore of said track link prior to attaching said fastening means of said rail segment.

* * * * *